United States Patent [19]

Fuller

[11] Patent Number: 4,713,031

[45] Date of Patent: Dec. 15, 1987

[54] SUBMERGED BOBBER RELEASE DEVICE FOR FISHING RODS AND THE LIKE

[76] Inventor: Kevin S. Fuller, 3418 Greenbrier, Vadnais Heights, Minn. 55110

[21] Appl. No.: 876,773

[22] Filed: Jun. 20, 1986

[51] Int. Cl.[4] .............................................. B63B 22/10
[52] U.S. Cl. .......................................... 441/8; 441/23; 441/27
[58] Field of Search ....................................... 441/6–8, 441/23, 27, 95, 97; 43/25

[56] References Cited

U.S. PATENT DOCUMENTS

| | | | |
|---|---|---|---|
| 2,479,098 | 8/1949 | Cardinal | 441/8 |
| 2,528,799 | 11/1950 | Strong | 441/8 |
| 3,624,849 | 12/1971 | Brannaker | 441/8 |
| 4,126,907 | 11/1978 | Fish | 441/8 |

*Primary Examiner*—Sherman Basinger
*Attorney, Agent, or Firm*—Peterson, Wicks, Nemer & Kamrath

[57] ABSTRACT

The device includes a tubular housing open at one end and closed at the other end by an adhesively attached cup-shaped cap. Within the closed end is a well having a bottom formed with a slot therein. Contained within the well is a water-soluble element, such as an aspirin tablet, which prevents a bobber from being discharged by a slightly compressed coil spring through the open end of the housing. A staple-like tongue on one end of the bobber interferingly engages the aspirin tablet until the tablet becomes dissolved by water entering the housing, as it does when the device is submerged. The bobber has a flange at the inner end from which the tongue projects, whereas the other end of the bobber is flared. Both of these ends are provided with angularly offset notches to facilitate the passage of water through the open end of the housing, through the slot, and into contact with the aspirin tablet. When the tablet dissolves, then the slightly compressed spring causes the bobber to be ejected through the housing's open end. It then floats to the surface to provide a visual indication as to where the submerged fishing rod or other article has come to rest on the bottom of the body of water. The device is held in place by a flexible strap passing through an opening in a longitudinally directed mounting rib. Additionally, pressure sensitive tape has one adhesive surface in contact with the rib and a second such surface in contact with the fishing rod (or other item). The same pressure sensitive tape fixedly anchors the free end of the line, the major portion of which is enwrapped about the bobber. The line passes through a small hole in the housing.

14 Claims, 6 Drawing Figures

U.S. Patent  Dec. 15, 1987  4,713,031
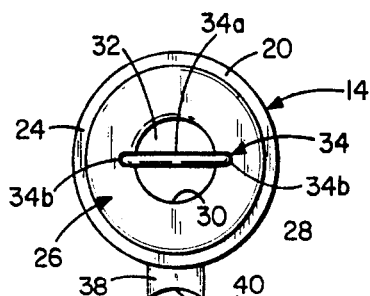
FIG. 3
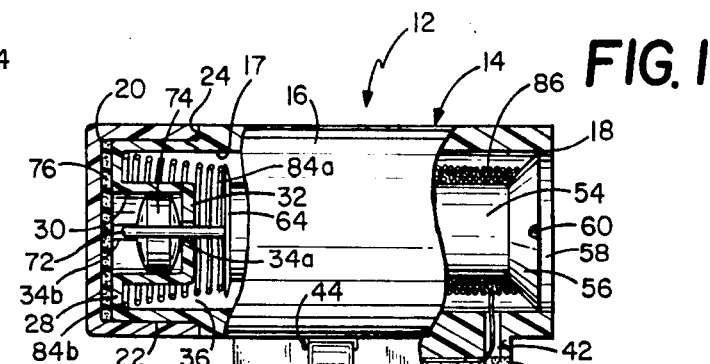
FIG. 1
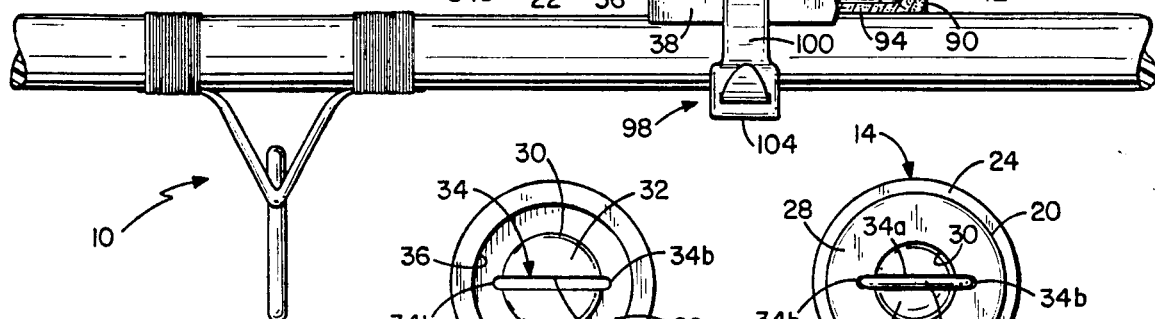
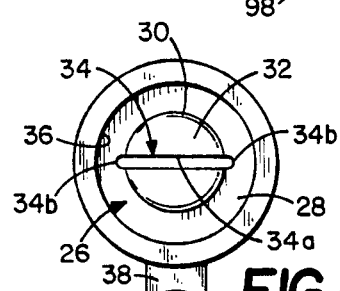
FIG. 4  FIG. 5
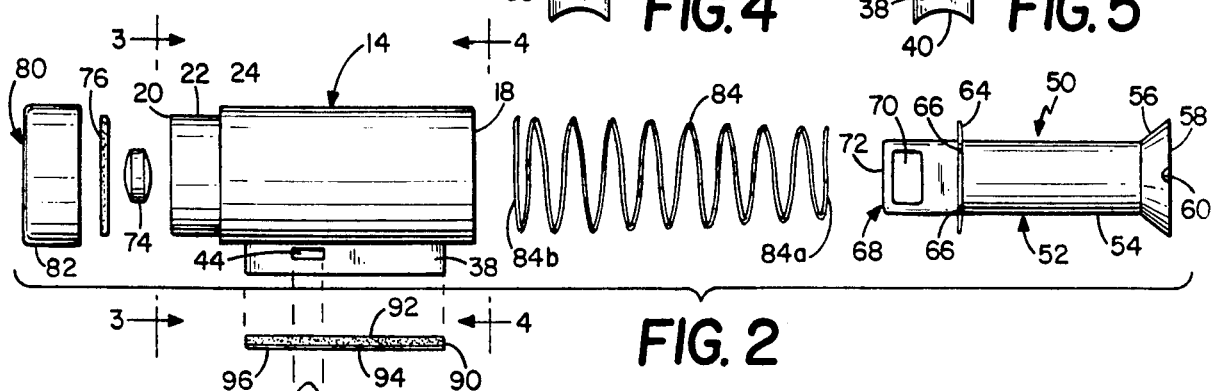
FIG. 2
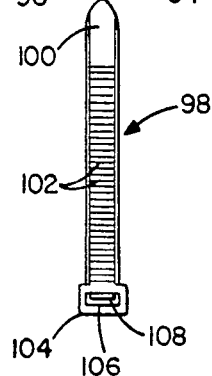
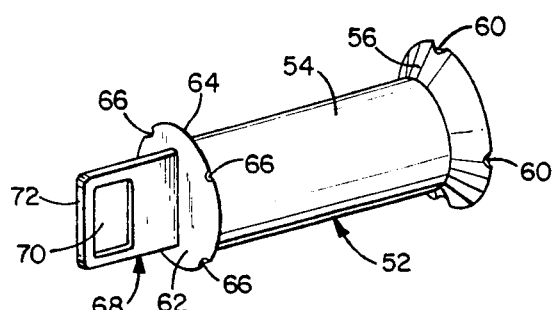
FIG. 6

4,713,031

SUBMERGED BOBBER RELEASE DEVICE FOR FISHING RODS AND THE LIKE

BACKGROUND OF THE INVENTION

1. Field of the Invention

This invention relates generally to a device for enabling the retrieving of submerged articles, and pertains more particularly to a device for recovering fishing rods that have inadvertently fallen into a body of water.

2. Description of the Prior Art

A number of devices have appeared in the patent literature which have been designed to recover fishing rods and other articles after they have fallen into a body of water, such as a lake or river. These various devices have possessed certain shortcomings that are believed to have militated against any widespread use of such a device.

Perhaps the closest device for locating a submerged fishing rod is depicted in U.S. Pat. No. 2,479,098, granted on Aug. 16, 1949 to William E. Cardinal for "Device for Locating Submerged Articles." While this device contemplates the use of a dissolvable aspirin tablet, the tablet is vulnerable to atmospheric moisture which could cause the undesired release of the indicating means comprised of a layer of cork sandwiched between two plates. Also, the way in which the aspirin tablet is placed into its float-restraining relationship is somewhat difficult. Also, the manner in which the device is attached to the reel on a fishing rod is more difficult than need be. Still further, the device is not as compact as it should be. However, the greatest drawback lies in the fact that one cannot prevent moisture from inadvertently dissolving the aspirin tablet so that a premature and unwanted release of the cork occurs.

SUMMARY OF THE INVENTION

An important object of my invention is to provide a device for enabling the retrieving of a submerged article, such as a fishing rod, in which the device is atmospherically moisture proof. When a readily dissolvable aspirin tablet is employed to maintain the bobber within the housing of the device, any moisture entering must traverse a rather tortuous course when practicing my invention. Even if some moisture should reach the aspirin tablet, provision is made for the absorbtion of the major portion of such moisture by means of a sponge-like disc. Consequently, my device is for all intents and purposes moisture proof; more specifically, the device is virtually completely rain proof when mounted properly on the article to be retrieved in the case of a mishap.

While an important object of the invention is to prevent a premature or inadvertent release of the bobber that signals the location of the submerged article to be retrieved, another object is to provide a quick release of the bobber when the article to which my device is attached is fully submerged, the water being able to enter quite quickly under these circumstances in contrast to only atmospheric moisture in the form of, say, rain which should not cause the bobber to be released. More specifically, an aim of my invention is to provide a device of the foregoing character in which the release occurs in less than three minutes after submersion.

My invention has for an additional object the location of a dissolvable tablet so that it cannot be crushed or damaged, the tablet residing in a recessed well which adequately protects it from damage.

Another object is to provide a device of the foregoing character that can be quickly attached to a variety of items, especially a fishing rod, and will remain attached during the use of the item. More specifically, it is within the contemplation of the invention to employ a simple security strap which will reliably hold the device in place on a fishing rod, preferably with the assistance of a double coated adhesive tape or strip.

Where the device is to be attached to a fishing rod, an aim of the invention is to provide a device that is sufficiently miniaturized and lightweight that it will not interfere with the fishing rod during casting or trolling. In this regard, it is within the purview of the invention to provide a retrieving device that is less than two inches in length and which weighs less than one-half ounce.

Still another object of the invention is to provide a retrieving device that can be attached to a fishing rod employing either an open face or closed face reel. Thus, the device possesses considerable versatility as far as being attached to a fishing rod, and can also conveniently be attached to other articles, such as tackle boxes or outboard motors.

The invention also has for an object the provision of a device that is sufficiently simple so that it can be inexpensively fabricated for only a single or one-time use. While my device will be seldomly or infrequently needed, nonetheless, when the need does arise it serves a very worthwhile purpose. The cost is sufficiently low that the device, once it has served its purpose as far as locating a submerged article, can be discarded and a new device substituted therefor. Actually, my device can be manufactured for such a low figure that the buyer will be encouraged to purchase two such devices at the same time.

Briefly, my invention envisages a small spool-like bobber having lightweight line wrapped thereon, the length being sufficient so as to permit the bobber to float to the surface in the deepest body of water that is expected to be encountered. The bobber is releasably retained in a tubular housing by means of a dissolvable element, such as an aspirin tablet. To achieve this, the bobber is provided with a tongue having an opening therein that forms a U-shaped or staple-like bridging portion. The housing is formed with a recessed well that contains the aspirin tablet when placed within the opening formed in the tongue. Although a coil spring normally biases or urges the bobber outwardly through the open end of the tubular housing, the staple-like end of the tongue reacts against the aspirin tablet to prevent ejection of the bobber until the tablet has been dissolved by reason of the fishing rod or other article having fallen overboard into a body of water.

An imperforate cap closes the end of the device containing the aspirin tablet therein so that atmospheric moisture can only enter through the open end of the tubular housing. When entering the open end of the tubular housing, any moisture must traverse a rather intricate and irregular path via notches provided at the opposite ends of the spool-type bobber. Even if the moisture reaches the aspirin tablet, a sponge-like disc will absorb a small amount of moisture so as to minimize the likelihood of a premature or unwanted release of the bobber. Yet, when the device, owing to its attachment to the article to be located, is completely submerged, then water quickly flows into the housing and readily contacts the aspirin tablet or other dissolvable member so that release of the bobber occurs in a matter of only a few minutes.

Provision is made for utilizing a security strap that encircles the fishing rod, when this is the type of article to be guarded against loss. Also, there is a double-coated pressure sensitive adhesive tape that prevents shifting along the rod. Whereas one end of the lightweight line that is wrapped around the bobber is fastened to the bobber, the other end of the line is secured to the article to be protected by means of being sandwiched between the tape and the mounting rib, the adhesive coating on this particular side of the tape fixedly anchoring the line, whereas the adhesive coating on the other side of the tape assists in preventing any longitudinal shifting of the device along the rod, such as would occur during a casting operation.

BRIEF DESCRIPTION OF THE DRAWING

FIG. 1 is a fragmentary side elevational view of a fishing rod with my device attached thereto, portions of the device's housing having been broken away;

FIG. 2 is an exploded view of my device without the fishing rod, the scale being somewhat smaller than that employed in FIG. 1;

FIG. 3 is an end view taken in the direction of line 3—3 of FIG. 2 with the tongue end of the bobber being illustrated but without the aspirin tablet being present;

FIG. 4 is a view taken in the opposite direction without either the bobber or spring being present, the view being taken in the direction of line 4—4 of FIG. 2;

FIG. 5 is an end view corresponding to FIG. 2 but with an aspirin tablet included so as to retain the bobber in place within the housing.

FIG. 6 is a perspective view of the bobber without any retrieving line being wrapped therearound.

DESCRIPTION OF THE PREFERRED EMBODIMENT

FIG. 1 depicts a fishing rod denoted generally by the reference numeral 10. Although the reel is not shown in FIG. 1, it will be recognized that the fishing rod 10 is designed to accommodate an open face reel. Therefore, my retrieving device indicated generally by the reference numeral 12 is shown on the upper side of the rod 10.

My device 12 comprises a tubular housing 14 of suitable plastic having a cylindrical barrel 16; the barrel 16 has a bore 17 extending almost its entire length, doing so from its open end 18 to the opposite end which has been labeled 20. The end 20 is of slightly reduced diameter, forming a sleeve portion 22 with a shoulder at 24.

While the end 20 is virtually closed by an end wall 26, it is not completely closed. The end wall 26 includes a relatively thick, inwardly extending flange 28 that forms a generally cylindrical well that has been labeled 30 plus a well bottom 32. From FIGS. 1, 3, 4 and 5, it will be discerned that there is a slot denoted generally by the reference numeral 34. A transverse portion 34a of the slot 34 extends across the bottom 32 and portions 34b extend longitudinally through the inturned flange 28. From FIG. 4, it will be seen that the well 30 provides an annular recess 36 within the tubular housing 14, this recess 36 being visible in FIGS. 1 and 4.

At this time, attention is directed to a longitudinal mounting rib 38 on the underside of the housing 14. This rib 38 is molded integrally with the housing 14, possessing a shallow downwardly facing arcuate groove 40. Close inspection of FIG. 1 will indicate that there is a small hole at 42 which enables the yet to be described retrieving line to pass therethrough. The mounting rib 38 has a transverse mounting hole 44 formed therein.

The device 12 further comprises a bobber 50 that is in the form of a hollow spool 52 having a cylindrical body 54 and a flared end 56 which is closed by means of a disc 58. The flared end 56 is provided or formed with four quadrantly spaced notches 60 that enable water to pass therethrough as will hereinafter be made manifest. The bobber 50 further includes an end wall 62 having a radial flange 64 provided or formed with quadrantly spaced notches 66. As can be understood from FIG. 6, the notches 66 are angularly offset with respect to the notches 60.

Playing an important role in the practicing of my invention is a tongue 68 that is integral with the end wall 62, the tongue 68 having a rectangular opening 70 therein which forms a U-shaped or staple-configured end.

The bobber 50 is fabricated from two substantially identical plastic shells that are secured together, such as by sonic welding or by means of a suitable adhesive. The tongue 68 is formed on one of the shells. As far as the flared end 56 is concerned, the disc 58 can simply be adhesively secured within the flared end.

At this stage of the description, it should be obvious that a water soluable element is required. An aspirin tablet 74 adequately fulfills this function, although other dissolvable tablets or cardboard and the like could be employed. An aspirin tablet has the capability of dissolving quite readily when subjected to a sufficient amount of liquid. On the other hand, one does not wish the tablet 74 to dissolve unless the need for its dissolving comes into play by reason of the fishing rod 10 or other article having become submerged in a lake or river. To minimize the chance of any inadvertent dissolving of the tablet 74, a disc 76 of sponge material is employed which simply absorbs moisture up to a degree so that the tablet 74 remains intact.

One of the features of my invention is that the device 12 is virtually rainproof. Assisting in the achieving of this desirable goal is an imperforate cup-shaped end cap 80 having a wall or cylindrical skirt 82 of a size so as to slip over the sleeve portion 22 of the housing 14 and thus abut the shoulder 24. A suitable adhesive placed on the sleeve 22 prior to manually advancing the cap 80 thereover will assure that the cap 80 will be fixedly retained in place on the housing 14. Not only does the cup-shaped end cap 80 prevent any moisture from entering the left end of the housing 14, but it also protects the tablet 74 from being crushed or damaged. It will be recognized that the tablet 74 sits in the well 30 provided or formed in the left end of the tubular housing 14; the protected condition of the tablet 74 can readily be understood from FIG. 1.

It will be appreciated that the tablet 74 is manually inserted into the opening 70 so that the bight portion of the staple-like end 72 bears against the tablet 74 to prevent rightward or exiting movement of the bobber 50. The bobber 50 is biased to the right by reason of a coil spring 84 having a somewhat smaller end 84a and a somewhat larger end 84b. The uncompressed length of the coil spring 84 corresponds substantially to the overall length of the bobber 50. The turns or convolutions at the right or smaller end 84a of the coil spring 84 are smaller than the flange 64. On the other hand, the diameter of the left end 84b of the spring 84 is somewhat larger than the outer diameter of the well 30. In this way, when the spring 84 is inserted into the bore 17 of the cylindrical barrel 16, the left end 84b enters the annular recess 36, abutting the inturned flange 28. Further advancement to the left, as far as the bobber 50 is concerned, will cause the tongue 68 to advance through the slot 34 so that the staple-like end 72 projects sufficiently to enable the tablet 74 to be inserted into the opening 70. Since the left end 84b abuts the inner side of the flange 28, the coil spring 84 is compressed considerably from its natural or free length. Since the right end 84a is somewhat smaller than the flange 64 of the spool 52, the end 84a is restrained.

It is due to the compression of the coil spring 84 that the bobber 50 is biased or urged outwardly to the right when the tablet 74 is dissolved. In other words, the tablet 74 may be said to hold the bobber 50 in a cocked position so that when the tablet 74 dissolves, the bobber 50 will be urged outwardly through the open end 18 of the housing 14, then floating to the surface of the body of water.

What has not been referred to up to this point is the presence of a thin flexible retrieving line, actually in the form of a thin nylon string having a 14–20 pound test and on the order of 70 to 90 feet in length. This line 86 is tied to the cylindrical body 54 and then wrapped in a spool-like manner about the cylindrical body 54. A sufficient length of the line 86 at its other end is made use of to anchor the line 86 to the fishing rod 10. The end portion of the line 86 can in this way be threaded through the small hole 42 with a sufficient amount thereof extending along the arcuate groove 40 formed in the underside of the rib 38.

A strip of foamed plastic tape 90 having an upper adhesively coated surface 92 and a lower adhesively coated surface 94 is made use of in not only anchoring the line 86 but also in preventing longitudinal movement of the device 12 along the fishing rod 10. Initially, the plastic tape 90 is provided with a backer 96 that the user removes in order to expose the pressure sensitive adhesive surface 94. The line 86, of course, is anchored by means of the plastic tape 90 at the factory. Thus, all that the user need do is to remove the backer 96 in order to expose the adhesive surface 94.

Once having placed the rib 38 at the proper location on the rod 10 and also having adhered the lower surface 94 to the rod 10, then the user threads a security strap 94 that is comprised of a nylon strip 100 having transverse serations 102 formed thereon. At one end of the strip 100 is an enlarged head 104 having an opening 106 formed therein. Through the agency of a pawl or latch member 108, the security strap can be pulled tight enough so as to prevent any movement of the device 12 relative to the fishing rod 10. Of course, the holding action supplied by the security strip 98 is supplemented by virtue of the adhesion of the foamed plastic tape 90 to the fishing rod, the adhesive surface 94 accomplishing this purpose. Consequently, it should be obvious that the device 12, being quite compact (only two inches in length) and lightweight (less than one-half ounce) to begin with, is prevented from shifting along the fishing rod 10 and also from any angular shifting with respect to the rod 10. The fisherman for all intents and purposes is not even consciously aware that the device 12 is even there.

The manner in which my device 12 operates or functions has already been rather fully described. Recapitulating, it will be noted that if the fishing rod 10, or whatever article my device 12 is attached to, should fall overboard and settle on the bottom of the body of water, whether it be a lake or a river, the tablet 74 will quickly dissolve (in less than 60 seconds). Once dissolved, it is ineffectual to retain the bobber 50 within the tubular housing 14. Under the influence of the compressed coil spring 84, the bobber 50, together with the line 86 wrapped therearound, will exit via the open end 18 and will float to the surface of the body of water, thereby providing a visual indication of where the fishing rod 10 rests. All that the owner of the rod 10 need do is to pull in the line 86 and thus pull up the fishing rod 10 or whatever article my device 12 has been attached to. It will be appreciated that water readily enters into the housing 14 past the flared end 56 and past the flange 64, the notches 60 in the flared end 56 and the notches 66 in the flange 64 permitting the water to enter. On the other hand, rain or any moisture from the atmosphere must follow a difficult and intricate path in reaching the tablet 74 which is housed at the opposite end of the device 12. Once used, it is intended that the device 12 be used only once (if at all) and then discarded. A new one can then be substituted therefor. It is planned that the device 12 be manufactured and sold at such a low price that the purchaser will be induced to buy two, keeping the second one as a spare. Hopefully, even the first one will not be needed, but the insurance against loss of the item to which it is attached makes the purchasing of at least one device 12 a wise and precautionary decision.

I claim:

1. A device for enabling the retrieving of a submerged fishing rod or the like comprising a tubular housing having a cylindrical bore open at one end and closed at its other end, means within said other end for containing a water-soluble element therein, a bobber releasably confined within said housing having a tongue projecting from one end thereof, said bobber having an enlarged end at each end thereof substantially occupying said bore and having notches therein to facilitate the passage of water when said device becomes submerged, said element-containing means having a slot therein so that said tongue extends through said slot for retention by said water-soluble element until said element is dissolved.

2. A device in accordance with claim 1 in which said other end has a cup-shaped cap, said cap closing said other end so that any moisture must enter through only said one end and via said notches.

3. A device in accordance with claim 2 in which said housing has a well formed within said other end, said well having a bottom and said bottom having a transverse slot portion through which said tongue extends so as to be restrained by said soluable element.

4. A device for enabling the retrieving of a submerged fishing rod or the like comprising a tubular housing having an open end and wall means at the other end thereof, said wall means having a transverse slot therein, a bobber having a generally flat tongue projecting from one end thereof of a size to extend through said slot when said bobber is inserted in said housing, said tongue having an opening extending therethrough, spring means in said housing for normally urging said bobber in the direction of said open end, a water-soluble element received in the opening of said tongue and having laterally extending portions bearing against the portion of said wall means located adjacent said slot, an imperforate cup-shaped cap attached to said other end of said housing for protecting said water-soluble element from the entrance of moisture via said other end of said housing, and a supply of retrieving line enwrapped about said bobber, one end of said line being attachable to said bobber and the other end of said line being attachable to said fishing rod, whereby when a sufficient amount of water enters the open end of said housing, the entering water is constrained to flow past said bobber and through said slot in order to reach said water-soluble element to thereby cause release of said bobber and exiting thereof via said open end due to said spring, said housing having a cylindrical bore and said bobber having an enlarged end at each end thereof, said enlarged ends substanstially occupying the bore, and said enlarged ends having notches therein to facilitate the passage of water when said device becomes submerged.

5. A device in accordance with claim 4 in which the notches of said enlarged ends are angularly offset relative to each other.

6. A device for enabling the retrieving of a submerged fishing rod or the like comprising a tubular housing open at one end and closed at its other end, means within said other end for containing a water-soluble element therein, a bobber releasably confined within said housing having a tongue projecting from one end thereof, said element-containing means having a slot therein so that said tongue extends through said slot for retention by said water-soluble element until said element is dissolved, said other end having a cup-shaped cap and said cap closing said other end so that any moisture must enter through only said one end, and said housing having a well formed within said other end, said well having a bottom and said bottom having as transverse slot portion through which said tongue extends so as to be restrained by said soluble element.

7. A device in accordance with claim 6 in which said well forms an annular recess, the device further including a coil spring within said housing, one end of said coil spring abutting the bottom of said annular recess and the other end thereof abutting one end of said bobber so as to bias said bobber outwardly through said one end of said housing.

8. A device in accordance with claim 7 in which said housing has a hole extending outwardly therethrough near said open end for the accomodation of a section of retrieving line enwrapped about said bobber.

9. A device in accordance with claim 8 in which said housing has a rib for confronting said fishing rod, a strip of pressure sensitive tape having a first adhesive surface secured to said rib, said projecting end of said retrieving line being fixedly anchored by said pressure sensitive tape.

10. A device in accordance with claim 9 in which said tape has a second pressure sensitive adhesive surface for engaging the fishing rod.

11. A device in accordance with claim 8 in which said housing has an integral longitudinally directed rib, said rib having a transverse hole therein, and a flexible strap passing through said hole for encircling said fishing rod so as to at least assist in retaining said device on said fishing rod.

12. A device in accordance with claim 11 in which a plastic tape having oppositely facing adhesive surfaces is employed, one of said adhesive surfaces engaging said rib and the other of said adhesive surfaces being engageable with said fishing rod.

13. A device in accordance with claim 12 including a disc of moisture absorption material adjacent said water soluable element for absorbing at least some moisture to prevent said element from dissolving sufficiently to prematurely release said bobber under the influence of said coil spring.

14. A device in accordance with claim 13 in which said bobber is flared at one end thereof and has a flange at the other end thereof, said flared end having angularly spaced notches formed therein and said flange having angularly spaced notches formed therein, whereby the passage of water through the open end of said housing to said water-soluble element is facilitated when said device becomes submerged.

* * * * *